United States Patent [19]
Yang

[11] Patent Number: 5,990,662
[45] Date of Patent: Nov. 23, 1999

[54] NICKEL BATTERY CHARGING METHOD AND APPARATUS

[75] Inventor: Yi-Fu Yang, Aichi-ken, Japan

[73] Assignee: Toyota Jidosha Kabushiki Kaisha, Toyota, Japan

[21] Appl. No.: 09/120,327

[22] Filed: Jul. 22, 1998

[30] Foreign Application Priority Data

Aug. 6, 1997 [JP] Japan .................................... 9-211714

[51] Int. Cl.$^6$ ....................................................... H02J 7/00
[52] U.S. Cl. ........................................... 320/130; 320/132
[58] Field of Search .................................... 320/130, 132, 320/131, 129, DIG. 18, DIG. 21; 429/231, 220

[56] References Cited

U.S. PATENT DOCUMENTS

| | | | |
|---|---|---|---|
| 3,888,325 | 6/1975 | Reinbeck | 180/65 |
| 4,935,318 | 6/1990 | Ikoma et al. | 429/206 |
| 5,621,302 | 4/1997 | Shinohara | 320/148 |

FOREIGN PATENT DOCUMENTS 8-124596   5/1996   Japan .

Primary Examiner—Peter S. Wong
Assistant Examiner—Lawrence Luk
Attorney, Agent, or Firm—Oblon, Spivak, McClelland, Maier & Neustadt, P.C.

[57] ABSTRACT

Raising the charging acceptability of nickel battery. The setting of the initial SOC (state of charge) of hybrid electric vehicle battery to X% (for example 50%) is performed by two steps. The first one is a constant current charge until a fully charged state (S11, S12). Secondly, a discharging is performed until the target SOC of X% is obtained (S13, S14). This enables the interior part of the nickel positive electrode active particles to be assumed as a charged state so that during normal operation, charging and discharging can be performed relatively in the surface layer. This can increase the efficiency of oxidation-reduction in the nickel positive electrode, thereby raising the charging acceptability.

7 Claims, 18 Drawing Sheets

NICKEL BATTERY CHARGING METHOD AND APPARATUS

BACKGROUND OF THE INVENTION

1. Field of the Invention

The present invention relates to a charging method and apparatus for nickel batteries having a nickel positive electrode with nickel oxide as an active material, and more particularly to improvement of the input characteristics of nickel batteries.

2. Description of the Related Art(s)

Heretofore, various secondary batteries having different characteristics are known, among them an appropriate battery type is employed according to the purpose of the application. That is to say, the output and input power level and capacity of a battery are the most important characteristics for secondary batteries, and these characteristics differ greatly according to the purpose of the application for the battery. For example, hybrid electric vehicles (HEV) require batteries with high power input and output but low capacity.

Hybrid electric vehicles operate small internal combustion engines (ICE) at a point of maximum efficiency to yield a constant average power. The operation of this sort of engine at optimum efficiency both improves fuel efficiency and reduces the amount of exhaust gas emissions. Furthermore, sufficient treatment of the exhaust gas emissions can be performed at a subsequent stage until the pollutants in the exhaust gas emissions reach a small and fixed amount, thereby enabling the emission of pollutants to be kept to a minimum.

The secondary battery to be used in hybrid electric vehicles has the following two objectives.

(1) To furnish the necessary power for the extra demand, such as during acceleration or hill climbing, when the required driving power exceeds the average output power of the engine. On the other hand, when the required driving power is less then the average output of the engine, the battery accepts the output power of the engine for charging. Therefore, the driving of the engine is maintained at an optimum point. For this reason, an output performance of high discharge power is required for the battery.

(2) To increase the energy efficiency of the vehicle through the use of regenerative braking during deceleration by converting the braking force into electrical energy for use in charging the battery. For this reason, acceptability of high charging power is also required for the battery.

To achieve these objectives, the battery for the hybrid electric vehicle must be capable, at any time during vehicle travel, of outputting and accepting high electric power. Thus, the state of charge (SOC) of the secondary battery for the hybrid electric vehicle is initially set to approximately 50%. As a result, the secondary battery is charged or discharged according to the output state of the driving power, such as for acceleration or deceleration of the vehicle. Generally, since an overcharged or overdischarged state must be avoided for the secondary battery, charging and discharging are controlled so that the SOC falls approximately within 20% to 80%.

To increase the output performance and electric power acceptability of the battery, the capacity of the battery should be increased. However, hybrid electric vehicles carry a dynamo with the initial objective of reducing the capacity of the battery, and the basic requirement is to reduce the capacity of the battery as much as possible. Therefore, it is desirable for the battery in the hybrid electric vehicle to have a small capacity and to be capable of high electric power input and output.

Nickel hydride batteries are a known type of secondary battery. The nickel hydride battery uses a positive electrode of nickel oxide and nickel hydroxide as the active materials and a negative electrode of hydrogen occluding alloy. The nickel hydride battery has high electric power output and electric power acceptability relative to its capacity, which is considered preferable as a battery for hybrid electric vehicles. Furthermore, nickel hydride batteries basically do not emit gases and are maintenance free. In this specification, the term nickel battery is understood to mean any battery using nickel oxide as the active material, such as nickel hydride batteries, nickel cadmium batteries, and so forth.

The nickel hydride battery is disclosed, for example, in Japanese Patent Laid-Open Publication No. Sho 8-124596.

In this manner, the nickel hydride battery is the preferred battery for hybrid electric vehicles. However, when various types of tests were actually conducted using nickel hydride batteries in hybrid electric vehicles, it was found that the acceptability of charging current was less than the demand. In the application of nickel hydride batteries in various types of electrical apparatus, the charging efficiency does not present much of a problem. In other words, some electric power loss during charging does not present much of a problem since the accurate state of charge during charging is not necessary to know and the battery is overcharged with electric power from commercial power sources. However, any loss during charging in hybrid electric vehicle batteries makes it difficult to control the battery SOC to be operated in predetermined SOC range. Therefore, there remains a problem where it is desirable to improve the acceptability of charging current for the battery.

SUMMARY OF THE INVENTION

It is an object of the present invention to improve the acceptability of charging current by modifying the method for initial charging.

The present invention is characterized by a charging method for a nickel battery having a nickel positive electrode with nickel oxide as the active material, providing the initial charging steps of a full charging step for fully charging, and after full charging, an initial discharging step for discharging the above-mentioned nickel battery until a predetermined amount of initial charge remains whereby execution of the initial charging steps causes charging to occur near the center of the material that forms the nickel positive electrode.

This invention is also characterized by the above-mentioned nickel positive electrode which is formed from fine particles, where the particles have diameters from 1 $\mu$m to 100 $\mu$m.

This invention is also characterized by charging and discharging with constant current in the above-mentioned full charging step and in the above-mentioned initial discharging step.

This invention is also characterized by the above-mentioned nickel battery with nickel positive electrode being carried in a hybrid electric vehicle equipped with a dynamo for generating the charging current for the nickel battery and a motor that is driven by the discharging current from the nickel battery.

Furthermore, this invention is characterized by a charging apparatus for a nickel battery, which has a nickel positive electrode with nickel oxide as the active material, comprising charging means for charging by supplying charging current to the above-mentioned nickel battery discharging means for discharging by causing discharging current to be released from the above-mentioned nickel battery full charge detecting means for detecting a full charge of the above-mentioned nickel battery, and initial discharge detecting means for detecting the completion of discharge until a predetermined amount of initial charge whereby in performing initial charging of the above-mentioned nickel battery, the above-mentioned nickel battery is discharged until a predetermined amount of initial charge after being initially charged to a fully charged state.

In this manner, this invention uses one initial charging step to perform full charging, then discharging until a predetermined amount of initial charge. As a result, the positive electrode first completely turns into a nickel oxide material, the material of the charged state. Then, the positive electrode partially turns into a material of the discharged state (nickel hydroxide) from the subsequent discharging. At this time, the charging and discharging are performed in a direction from the surface to the interior. According to this invention, the positive electrode to its interior turns into the material of the charged state due to the initial full charge, and its outer shell turns into the material of the discharged state from the subsequent discharging.

In the prior art, initial charging was terminated by charging until the amount of initial charge as the target. In this case, initial charging terminates in the middle of charging from the outer surface to the interior. Therefore, the outer shell of the positive electrode active particles had turned into the material of the charged state while the interior material remained the discharged state. If charging and discharging are repeated using this initial state, charging will occur at the interface of the material of the charged state located in the out shell (charged area) and the material of the discharged state in the inner core (discharged area). Therefore, charging does not occur until protons migrate from the surface to the interface. For this reason, the overpotential is high, making the side reaction more likely to occur, which reduces the charge efficiency.

Furthermore, if the positive electrode is formed from particles, such as of nickel oxide, the charging efficiency can be improved by increasing the reaction area. In prior art, charging is performed at the interior, the area of the interface of the charged area and discharged area decreases. However, according to this invention, charging proceeds at the outer surface which can further raise the charging efficiency.

In particular, when a battery is used in a hybrid electric vehicle, it is necessary for the battery to accept the high electric power that is generated from regenerative braking. Therefore, it is extremely important to raise the charging efficiency in the manner of this invention. Raising the charging efficiency raises the fuel economy of the hybrid electric vehicle and the accuracy of the battery state of charge control.

Furthermore, this invention is applicable not only to nickel hydride batteries but also to batteries that use nickel oxide as the positive electrode active material, such as nickel cadmium batteries.

DESCRIPTION OF THE PREFERRED EMBODIMENT(S)

Preferred embodiments of the present invention will be described with reference to the drawings.

Figure 1:
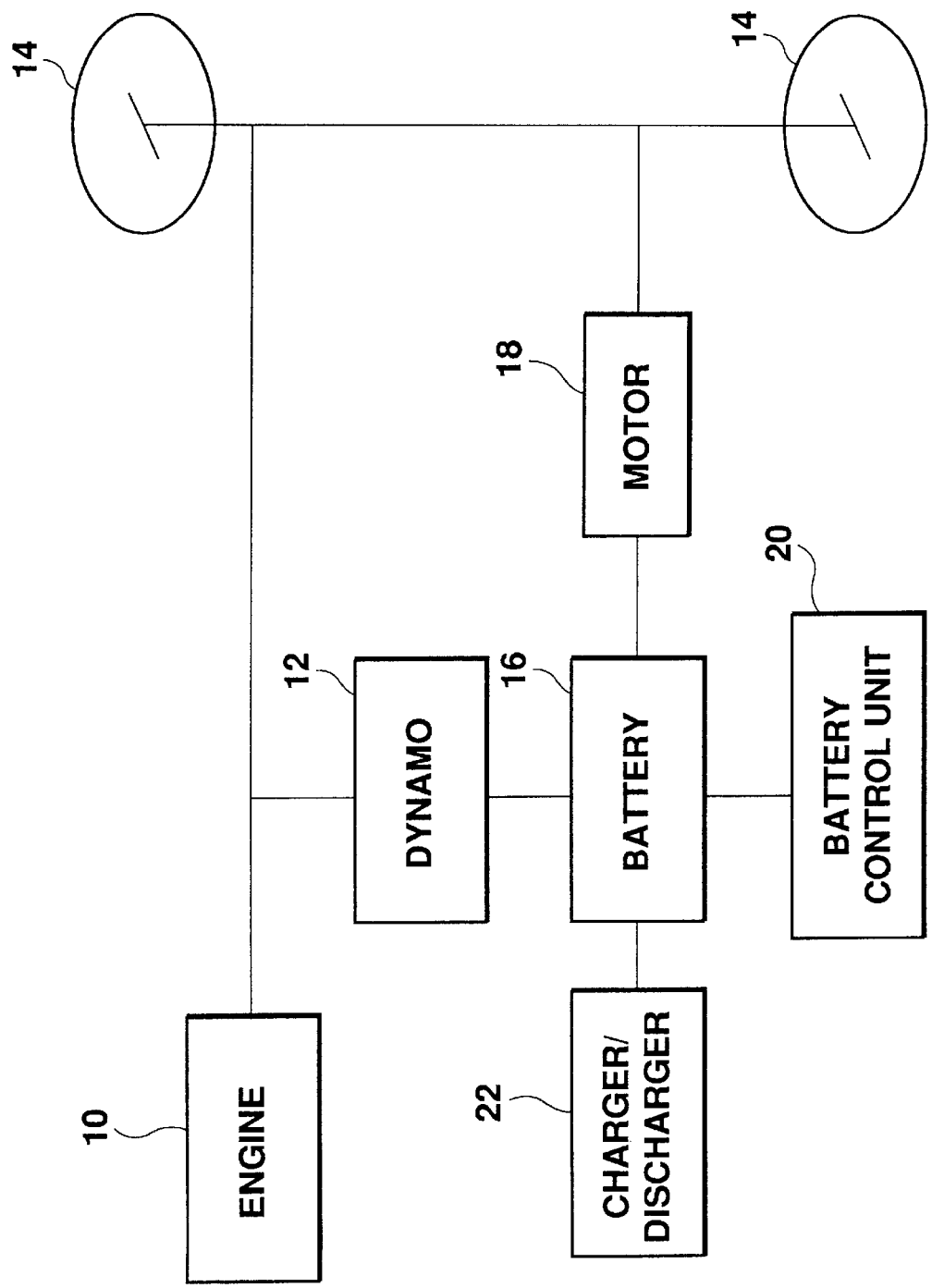
FIG. 1 shows an overall power system configuration of hybrid electric vehicle.

FIG. 1 is a block diagram showing a general configuration of a hybrid electric vehicle using a charging system concerning an embodiment of this invention. An engine 10 outputs the rotary power that is generated by an internal combustion engine, such as gasoline engine. A dynamo 12 converts the rotary power to electric power, where the output electric power is rectified and smoothed into DC electric power. The rotary power of engine 10 is also transmitted to wheels 14, thereby causing the hybrid electric vehicle to move.

A battery 16 accepts electric power from dynamo 12 for charging and supplies electric power to motor 18. Once the main switch is turned on to place the hybrid electric vehicle in a state ready for traveling, engine 10 is always driven under constant conditions so that constant electric power is generated from dynamo 12. If the electric power from dynamo 12 is less than the power consumption of motor 18, battery 16 supplies the needed amount to the motor by discharging current. Conversely, if the electric power from dynamo 12 is larger than the power consumption of motor 18, battery 16 accepts the surplus electric power for charging.

Furthermore, regenerative braking is used for braking in the hybrid electric vehicle and the regenerative electric power is output from motor 18. The regenerative electric power charges battery 16. An induction motor is used, for example, for motor 18, and the DC electric power from battery 16 is converted into a predetermined AC current by an inverter (not shown) to drive the induction motor. Therefore, the regenerative electric power is also output from the inverter.

A nickel hydride battery is used for battery 16. The nickel hydride battery uses for the positive electrode a sintered positive electrode plate with nickel oxide (or nickel hydroxide) as the main active material. For the negative electrode, a hydrogen occluding alloy is used. Since the capacity of the negative electrode is made larger than that of the positive electrode, the battery capacity is determined by the capacity of the positive electrode. In this embodiment in particular, particulate nickel oxide (nickel hydroxide) is used for the positive electrode, and each particle undergoes oxidation-reduction respectively from charging and discharging. With smaller particle diameters, the surface area increases, thereby raising the charge-discharge performance. However, to maintain the shape of the positive electrode, a particle diameter of a certain size is necessary. In this embodiment, particle diameters of approximately 1 μm to 100 μm are employed.

A battery control unit 20, connected to battery 16, detects and controls the state of charge (SOC) of the battery by detecting the discharging current from battery 16 and the charging current to battery 16.

Charger/discharger 22 is provided separately from the hybrid electric vehicle and is connectable to a commercial power source. Charger/discharger 22 both rectifies AC electric power from the commercial power source into DC electric power at a predetermined voltage for output, and dissipates the electric power from battery 16, such as through a discharge resistor. Charger/discharger 22 may be carried in the hybrid electric vehicle, or dynamo 12 may be made to perform the function of the charger and motor 18 may be made to perform the function of the discharger.

In this sort of configuration, charger/discharger 22 is not connected to battery 18 during normal traveling. Engine 10 is driven and the power consumption of motor 18 varies with the traveling conditions of the hybrid electric vehicle. In other words, the power consumption of motor 18 increases during acceleration and decreases when the vehicle is stopped or traveling at a constant speed. Furthermore, during braking, regenerative electric power is generated by motor 18. Thus, the hybrid electric vehicle travels while battery 16 charges and discharges.

Figure 2:
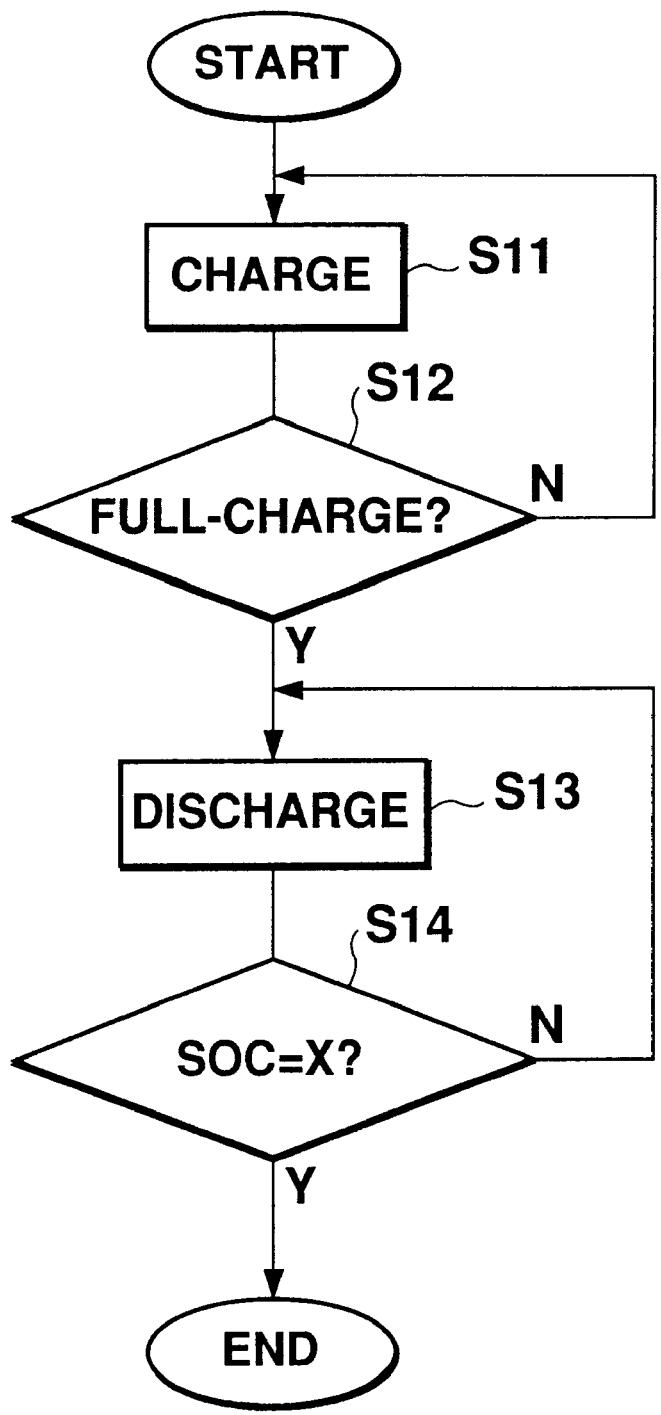
FIG. 2 is a flowchart showing the general operation.

Next, the initial charging of battery 16 in this embodiment is described with reference to FIG. 2. Charging and discharging in initial charging is performed using charger/discharger 22, however, dynamo 12 and motor 18 may also be used as described above.

First, with charger/discharger 22 connected, battery 16 is charged (S11) by supplying a constant charging current to battery 16. Next, the SOC of battery 16 is detected by the battery control unit 20, and a judgment (S12) is made as to whether or not battery 14 is fully charged (SOC=100%). If battery 16 is not fully charged in S12, the operation returns to S11 and charging is continued. The detection of the SOC of battery 16 may employ any suitable method, such as using a current integrating meter provided in battery charger/discharger 22 or detecting the fully charged state from the voltage of battery 14.

When battery 16 is charged to the fully charged state and the judgment in S12 becomes YES, discharging is initiated (S13). Then, the SOC of battery 16 is checked by battery control unit 22 and a judgment is made as to whether the SOC has reached a predetermined initial set value X% (S14). If SOC has not reached X% in S13, the operation returns to S13 and discharging is continued. In S14, SOC reaches X% and the judgment becomes YES so the operation for initial charging is terminated.

The initial set value is assumed, for example, to be 50%. The reason is a value of this extent is preferable in order for battery 16 to have suitable discharging performance and current acceptability. The hybrid electric vehicle travels using battery 16 for which this sort of initial charging has been completed. During traveling, the SOC of battery 16 varies with the traveling conditions. Generally, the output of motor 18 is regulated when the SOC approaches 20% so that the SOC during traveling is kept within a range of 20% to 80%. On the other hand, when the SOC approaches 80%, the generation of regenerative electric power is regulated through the use of a mechanical brake and the regenerative electric power is dissipated, such as through a discharge resistor.

Therefore, in this embodiment, after being fully charged, battery 16 is discharged to set its SOC to the predetermined initial set value (X%). This is described next.

Figure 3A:
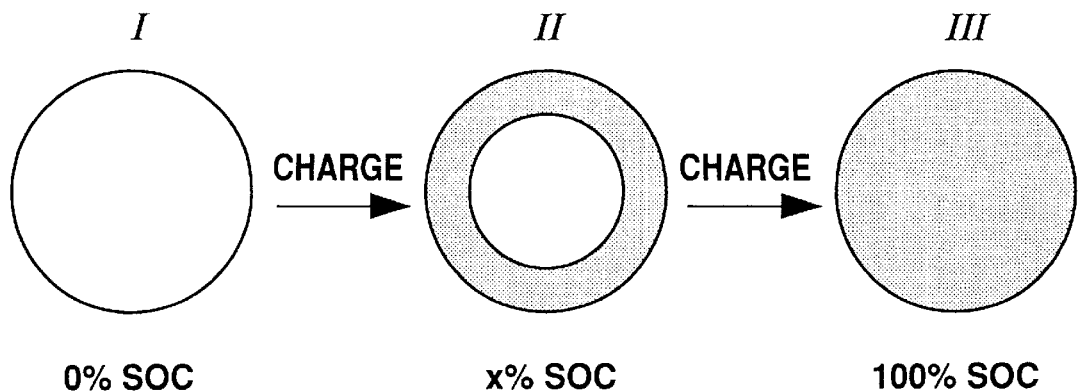
FIGS. 3(A), 3(B) and 3(C) show the states of charge of a particle in the positive electrode.

FIG. 3(A) shows a conceptual view of the charged state of one particle of the positive electrode in initial charging. First, in state I of SOC=0%, the positive electrode particles are all in the discharged area (non-charged area) with the nickel being $Ni(OH)_2$. When charging is performed in this state, an oxidation reaction progresses from the surface of the positive electrode particles, protons ($H^+$) are released from the surface, and the charged area (area of NiOOH) increases. In other words, the protons diffuse from the inner surface of the charged area (interface of charged area and discharged area) to the surface. In state II where charging has reached SOC=X%, the charged area assumes a donut shape from the surface. When charging is further continued and a full charge is attained, the entire particle turns into a charged area as shown in state III.

Figure 3B:
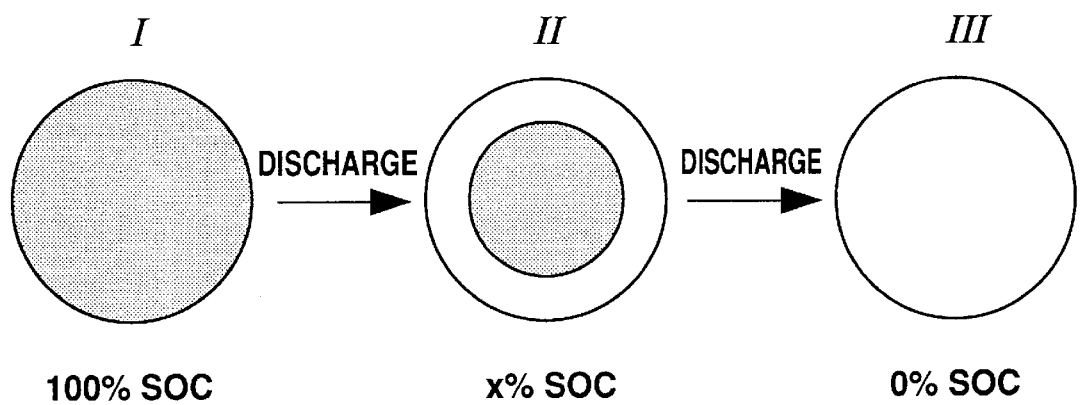

Next, discharging is described with reference to FIG. 3(B). When discharging is performed from a fully charged state, protons are taken in from the surface of the particle and NiOOH in the charged area is reduced. As a result, the discharged area expands from the surface, and a donut-shaped discharged area forms around the perimeter with the center still charged (state I to state II). At this time, protons diffuse from the particle surface to the interface of the charged and discharged area, and NiOOH of the charged area is reduced. Then, when state III is reached for a completely discharged state, the entire particle becomes a discharged area.

In the prior art, initial charging is terminated by charging until the amount of initial charge as the target, for example, by charging until SOC=50%. Therefore, the state at this time is given by state II in FIG. 3(A). On the other hand, in the present embodiment, discharging is performed until a target amount of charge (such as 50%) after initially charging until a full charge. The state at this time is given by state II of FIG. 3(B).

In this manner, the charged area gradually decreases in the prior art due to the discharging that occurs from near the surface. On the other hand, charging basically occurs at the inner surface of the charged area. Accordingly, the proton diffusion length increases during charging.

Figure 3C:
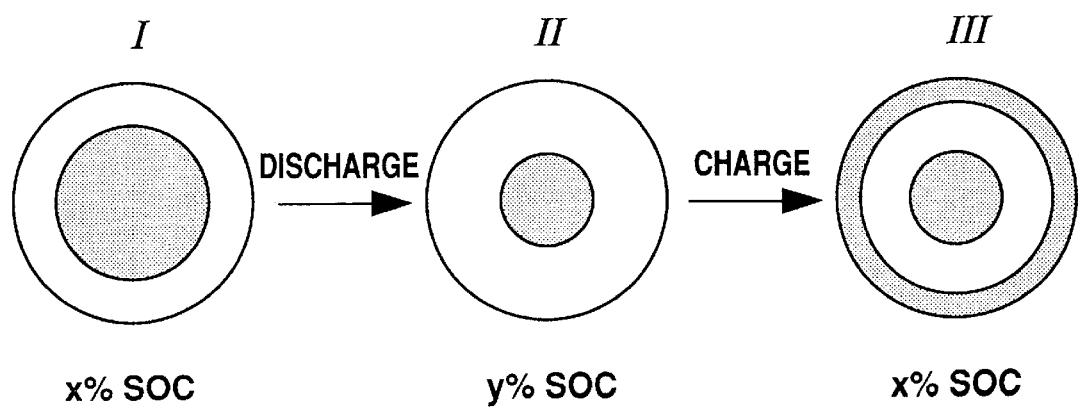

On the other hand, when discharging is performed in this embodiment, the charged area decreases in the way shown in FIG. 3(C). The state of Soc decreasing from X% to Y% is shown in states I and II. Then, when charging is performed in this state, a charged area is formed on the surface of the particle separately from the charged area in the center. In other words, as shown in state III, charging occurs from the surface and the charged area is formed near the surface. In this state, discharging occurs from the outer surface of the charged area that was formed on the surface, and charging occurs from the inner surface. Therefore, during normal use, most of the reaction occurs at a thin area at the surface. Then, when discharging continues and the charged area at the surface disappears, discharging occurs from the surface of the charged area at the center and the charged area decreases.

Basically, in this manner, the probability increases in this embodiment for the occurrence of charging and discharging near the surface of the nickel oxide particles which form the positive electrode. Therefore, the proton diffusion length during charging shortens and the surface area to be used by the reaction (area of interface of charged area and discharged area) can be increased. For this reason, the polarization of nickel electrode is lowered, thereby the acceptability of charging current is raised.

EXAMPLE(S)

Figure 4:
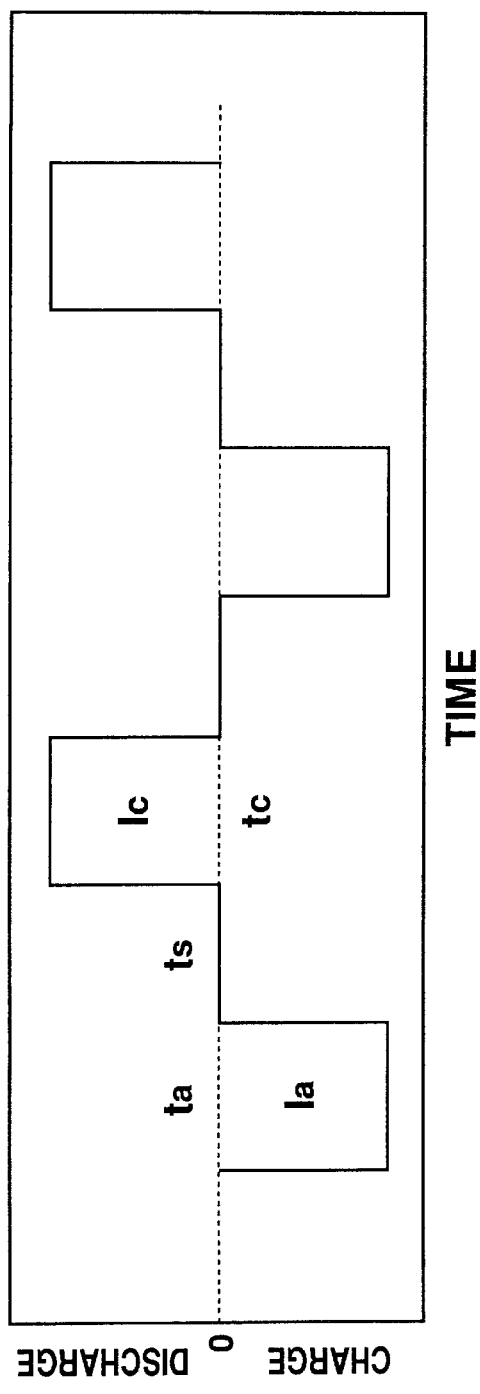
FIGS. 4(A) and 4(B) show the current change and voltage change in the pulse charging and discharging patterns.
Figure 4:
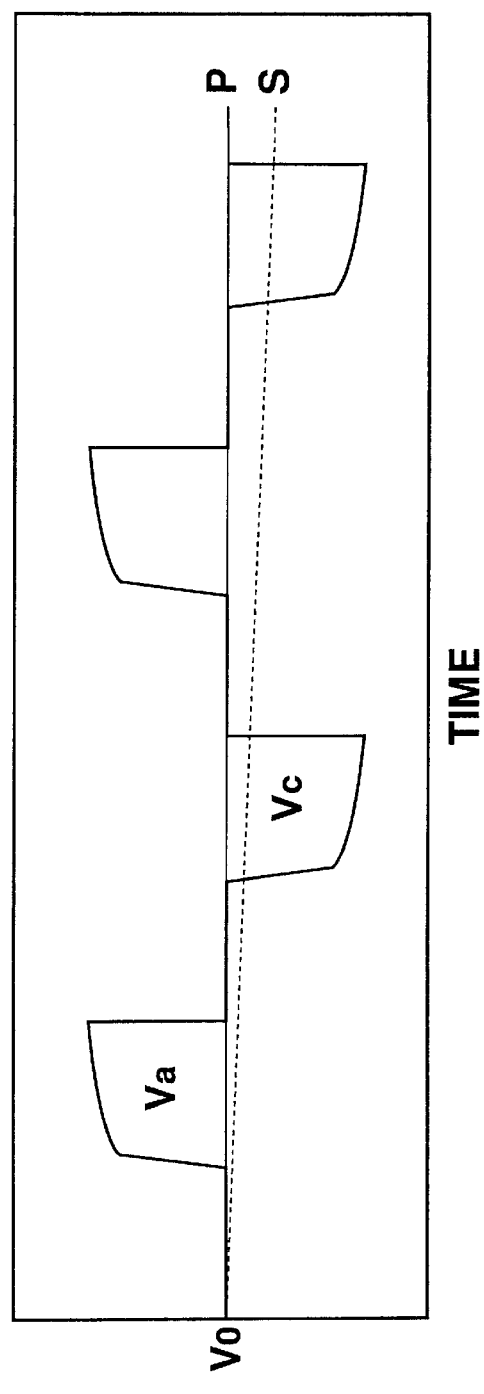

Charge acceptability at different current magnitude is tested by repeating a predetermined charging-discharging pattern for a battery that has undergone initial charging according to the present embodiment and for a battery that has undergone initial charging according to the prior art. FIGS. 4(A) and (B) show the repetitive patterns for charging and discharging in the test that was conducted. FIG. 4(A) shows the pattern of current for charging and discharging, wherein one cycle comprises processes of charging at Ia for period ta, stopping the current for rest period ts, then discharging at Ic for period tc, and stopping the current for period ts. Thus, by sequentially repeating this cycle, charging and discharging with rest time ts were repeated.

Accordingly, the electric charge Qai (AH) that is charged in one pulse becomes $$Qai = Ia * ta \quad (1)$$

On the other hand, the electric charge Qci (A·H) that is discharged in one pulse becomes $$Qci = Ic * tc \quad (2)$$

Therefore, the total amount of charge Qa and amount of discharge Qc in the entire sequence become $$Qa = \Sigma Qai \quad (3)$$

$$Qc = \Sigma Qci \quad (4)$$

If Qa=Qc is set, there should be no change in the SOC of the battery resulting from the execution of the above-mentioned sequence. The SOC of the battery is detected before and after the above-mentioned charging and discharging to determine the amount of change $\Delta Q$.

The amount of charge to the battery can be checked by first charging the battery under constant conditions, then discharging the battery at a relatively small constant current. After the sequential test above is performed, the battery is discharged at the same relatively small constant current mentioned above. Checking the remaining capacity after the test enables $\Delta Q$ to be detected.

Once $\Delta Q$ is determined, the charging efficiency ($\eta$) can be determined from $$\eta = (Qa - \Delta Q)/Qa$$

Rest time ts is provided to release the heat generated from the previous pulse so that the temperature is kept constant during charging and discharging with all pulses, and does not influence the calculation of charging efficiency.

In the measurement of charging efficiency, the magnitude of current and the length of time are automatically controlled by the charger and the corresponding voltage is measured with the elapse of time. The behavior of the measured voltage is shown in FIG. 4(B), where Va is the pulse voltage while charging with pulse current and Vc is the pulse voltage while discharging pulse current.

During the operation of charging and discharging through pulse current, V0 exhibits two types of behavior according to the charged state of the surface. When the magnitude of the pulse current that was set can be sufficiently accepted, the relationship of Qai=Qci is maintained in the surface layer for all cycles, and there is no substantial change in SOC in the surface layer for all cycles. Since there is no change in the total SOC, V0 remains constant as shown by line P in FIG. 4(B). However, if the discharging from the surface layer of the particle advances while electric charge can be accepted in the interior of the active particle and the charging acceptability is lower than the magnitude of the charging current that was set, the electric charge that was actually accepted in the surface layer of the particle is less than that actually discharged so that SOC essentially decreases even though the condition of Qai=Qci is maintained.

Under these sort of conditions, V0 gradually drops down (line S in FIG. 4(B)).

Examples of various tests are described in the following. In comparative examples, conditions different from those in the embodiment of this invention (amount of pulse current) are employed. The reason is if the amount of pulse current identical to that of this invention is used, the amount of heat generated would be high and would prevent stable tests from being conducted. Therefore, for the comparative examples, conditions are used where the amount of pulse current is lower and the charging efficiency rises. When the amount of pulse current in the comparative examples is made identical to that of the invention, the charging efficiency drops further.

Example 1

A sealed, maintenance-free nickel oxide/metal hydride battery (nickel hydride battery) having a rated capacity of 6.5 (25° C.) AH and a rated voltage of 7.2 V was employed as a typical example of the present invention. The battery cell comprises a Ni oxide positive electrode with nickel oxide (and nickel hydroxide) as the active material, a negative electrode formed from hydrogen occluding alloy that can perform hydrogen absorption-desorption reactions, an alkaline electrolyte, and a separator.

Figure 5A:
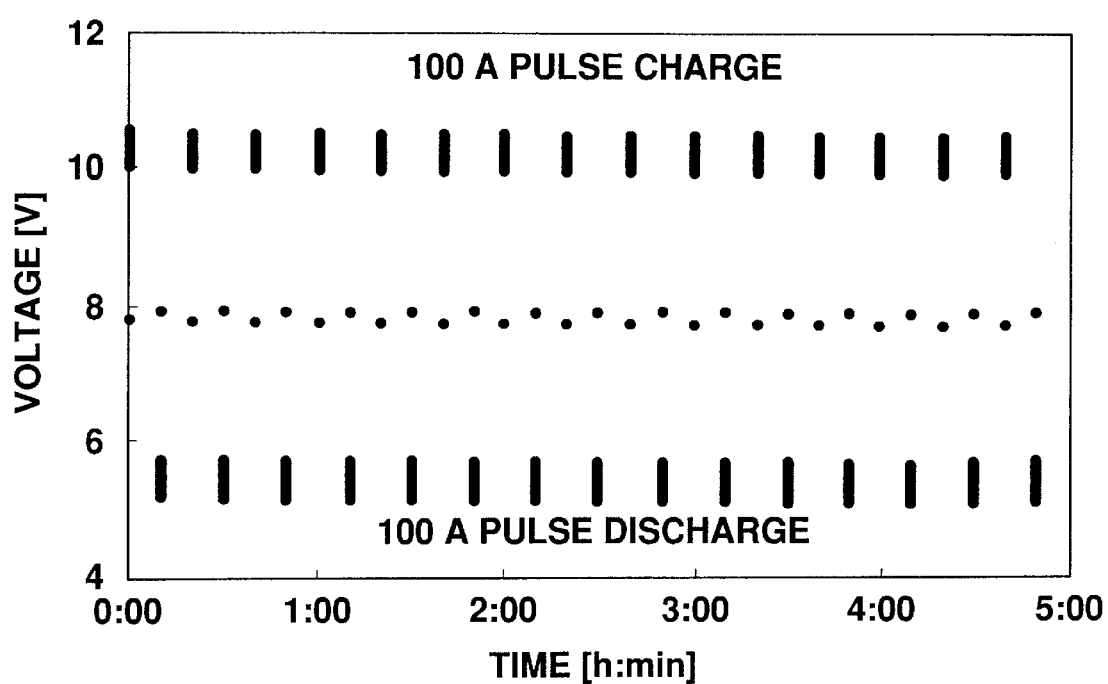
FIGS. 5(A) and 5(B) show illustration of a 100 A pulse current charge efficiency at 40° C. and 50% SOC set by the present inventive method.
Figure 5B:
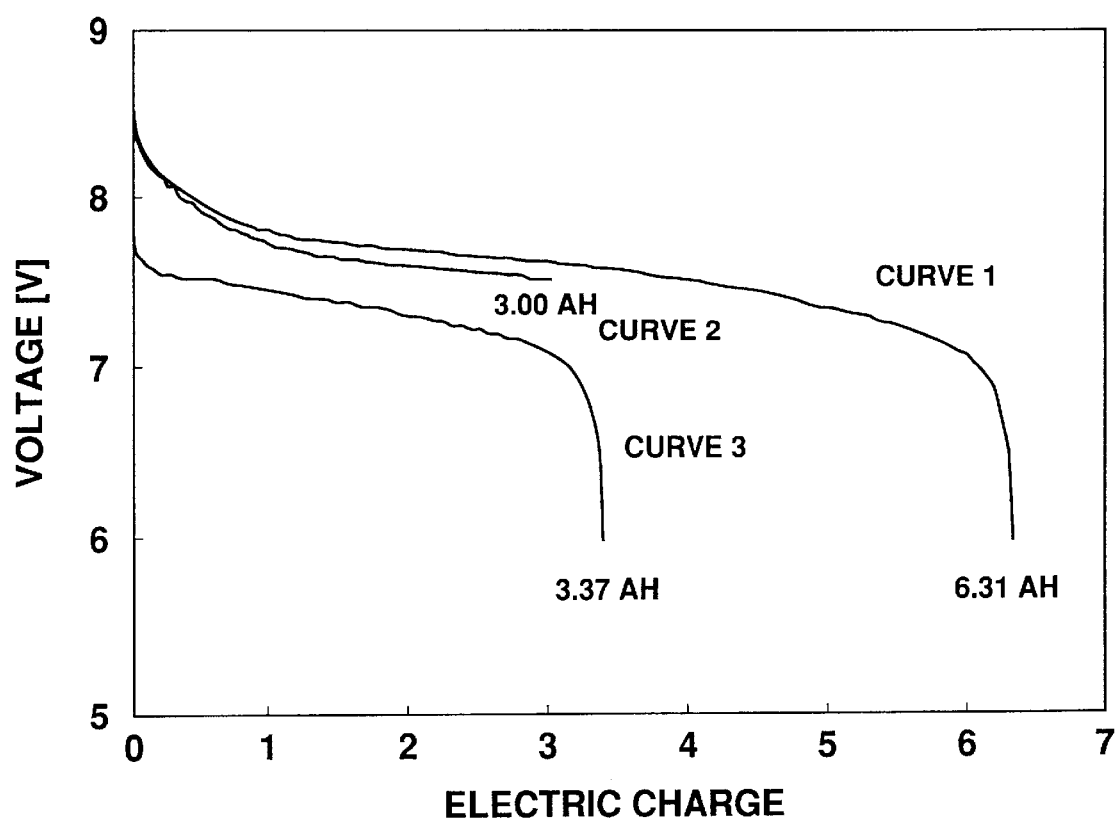

Battery 1 has its initial SOC set by the new method of this invention at 40° C. This new method includes two basic steps. The first step is a 7 AH (ampere-hour) charge at a rate of 1 C, with the actual accepted charge being 6.31 AH (detected by discharging to 6.0 V at a rate of C/3 40° C.). The second step is 3 AH discharge at a 1 C rate at 40° C. The result of these two steps was a final SOC of 3.31 AH. These two steps are shown in FIG. 5(B) as curves 1 and 2, respectively. For the nickel oxide positive electrode, the entire charge is actually stored in the inner core of the active particle. This is clearly illustrated in state II of FIG. 3(B) with X%=50%.

For comparison, the initial SOC of battery 2 was set by the conventional method with a 3.35 AH (ampere-hour) charge at a 1 C rate. The actual accepted charge was measured as 3.29 AH by discharging to 6.0 V at a C/3 rate. This is shown as curve 1 in FIG. 6(B). For the nickel oxide positive electrode, the entire electric charge is actually stored in the outer shell of the active particles. This is clearly illustrated in state II of FIG. 3(A) with X%=50%.

After the initial SOC was set for battery 1 by the method of the present invention, a charging and discharging program was performed with a constant 100 A pulse current at 40° C. One charging and discharging cycle comprises a 10 second charging period with the 100 A pulse current followed by a 10 minute rest, then a 10 second discharging period with the 100 A pulse current followed by a 10 minute rest. Under these conditions, Qai is equal to Qci. The entire pulse current charging and discharging sequence causes a total amount of charge of 4.15 AH and a total amount of discharge of 4.16 AH to occur. The voltage corresponding to the 100 A pulse current charging and discharging program is shown in FIG. 5(A). V0 is basically the same for all cycles. The value of V0 after pulse current discharging is slightly lower than after pulse current charging. The reason is that after pulse current discharging, V0 lowers because the electric charge in the surface layer decreases slightly.

After this 100 A pulse current charging and discharging, the change in the SOC of battery 1 was checked by discharging it to 6 V at a C/3 rate (discharging until the depth of discharge DOD=100%). The measured SOC is 3.37 AH as shown by curve 3 in FIG. 5(B). Taking into account the maximum error of the charger (charger/discharger 20) of 0.3% at 400 A, the error of the charger becomes ±0.1 AH. Therefore, the difference between the final SOC and the initial SOC lies completely within the error range of the charger. This result clearly proves that a 100% charging efficiency can be obtained through 100 A pulse current charging at 40° C. when the initial SOC is set using the method of the present invention.

Figure 6A:
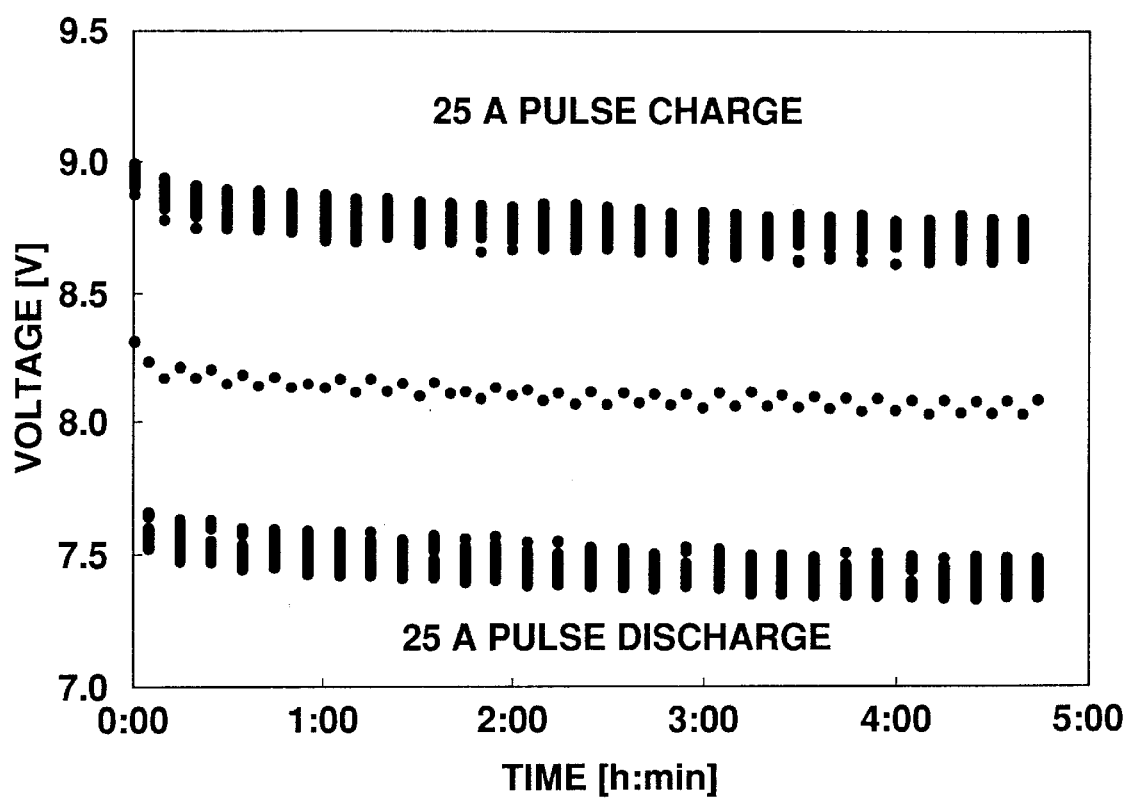
FIGS. 6(A) and 6(B) show illustration of a 25 A pulse current charge efficiency at 40° C. and 50% SOC set by the conventional method.
Figure 6B:
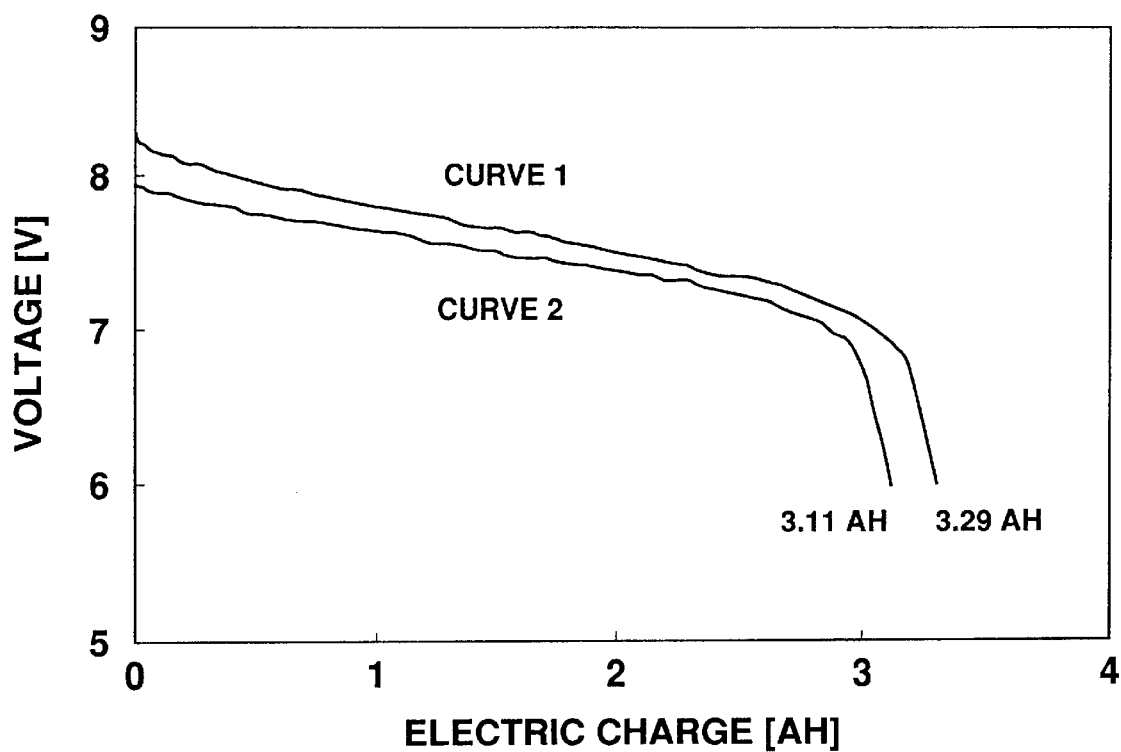

For battery 2, the initial SOC was set by the conventional method with initial charging until SOC=50% through 3.35 AH charging at a 1 C rate. In this case, the entire electric charge is stored in the outer shell, having a predetermined thickness, of the active particle. A 25 A constant pulse current charging and discharging program was performed at 40° C. Except for the magnitude of the pulse current, the pulse duration times and rest times are the same as those for the above-mentioned battery 1. The total amount of charge is 2.01 AH and the total amount of discharge is 2.01 AH. The voltage corresponding to the 25 A pulse current charging and discharging is shown in FIG. 6(A). Here, V0 decreases slightly indicating that the SOC of the surface has changed during pulse charging and discharging.

A quantitative test of the change in SOC was conducted by discharging at a C/3 rate until 100% DOD, resulting in a discharge of 3.11 AH. This is shown as curve 2 in FIG. 6(B). Therefore, the change in SOC ΔQ is –0.18 AH, which exceeds the error range of the charger. This decrease of SOC is caused by the low charge acceptability of battery 2 for which the initial SOC was set by the conventional method. The calculated charging efficiency is 91%.

The result of this example shows that the method of the present invention for setting the initial SOC of the battery is extremely effective in raising the charge acceptability of the battery at 40° C.

Example 2

For the same battery used in the above-mentioned example 1, initial charging was performed by the method of the present invention and by the conventional method. Initial charging was performed for battery 1 by using the two-step method of the present invention. In step 1, a 7 AH charge was performed at a 1 C rate at 40° C. The actual accepted charge was 6.23 AH as measured from discharging to 6.0 V at a C/3 rate (40° C.). Step 2 is a 3 AH discharge at a LC rate at 40° C. These two steps resulted in an SOC of 3.23 AH. The two steps are shown as curves 1 and 2 in FIG. 7(B). For the nickel oxide positive electrode, the entire electric charge is actually stored in the center of the active particle.

For comparison, the initial SOC of battery 2 was set by the conventional method. A 3.35 AH charge was performed at a 1 C rate at 40° C. The actual accepted charge was measured at 3.26 AH from discharging to 6.0 V at a C/3 rate. This is shown as curve 1 in FIG. 8(B).

Figure 7A:
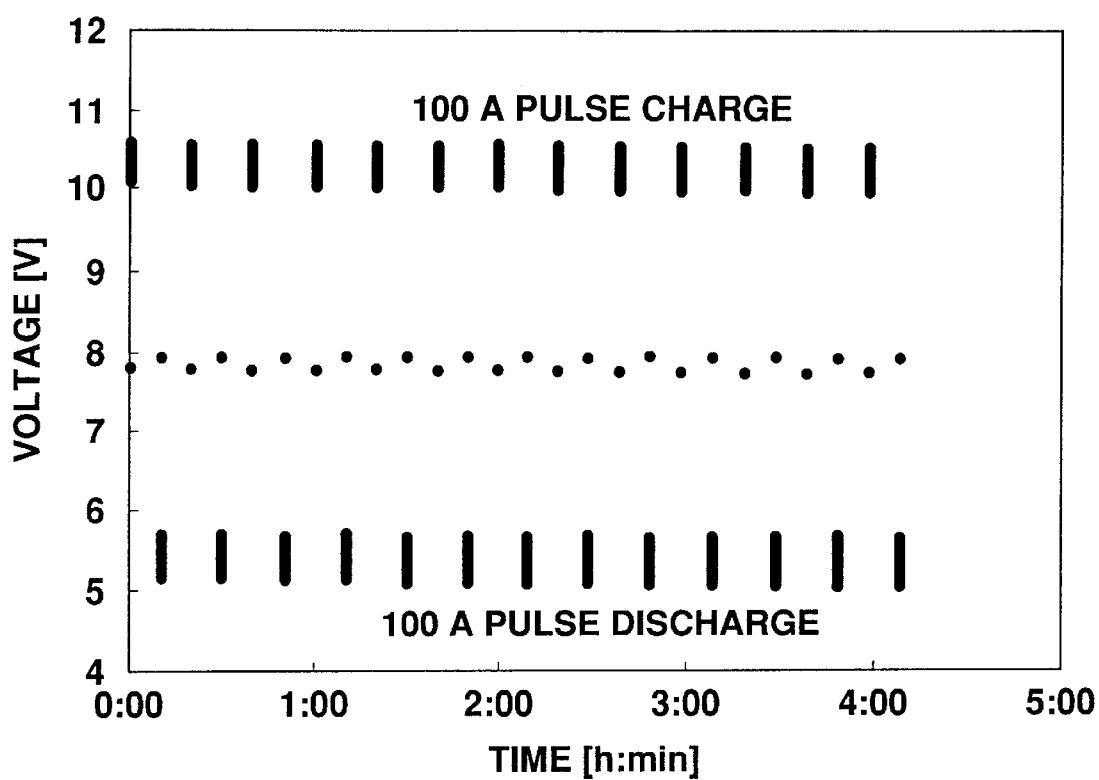
FIGS. 7(A) and 7(B) show illustration of a 100 A pulse current charge efficiency at 50° C. and 50% SOC set by the present inventive method.
Figure 7B:
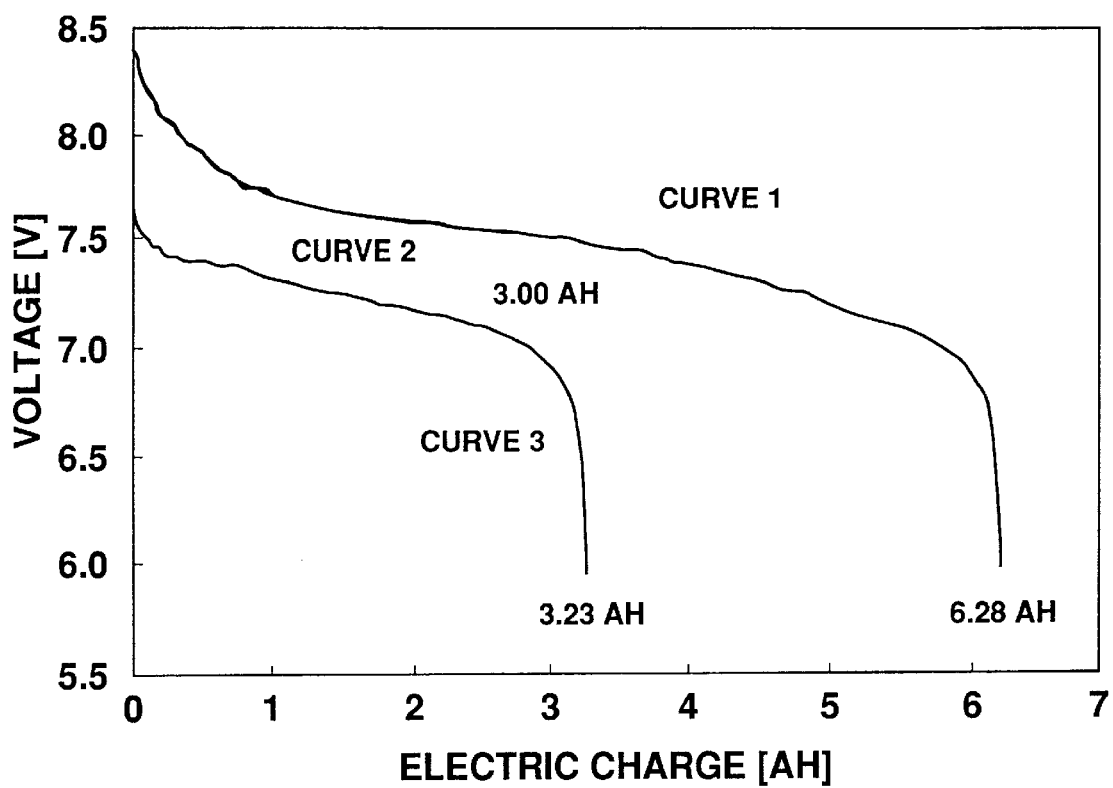

After the initial SOC was set for battery 1 by the method of the present invention, a charging and discharging program was performed with a constant 100 A pulse current at 50° C. One charging and discharging cycle comprises a 10 second charging period with the 100 A pulse current followed by a 10 minute rest, then a 10 second discharging period with the 100 A pulse current followed by a 10 minute rest. Here, Qai is equal to Qci. The voltage corresponding to the 100 A pulse current charging and discharging is shown in FIG. 7(A). V0 is basically the same for all cycles. The total amount of charge is 3.59 AH and the total amount of discharge is 3.61 AH.

After the 100 A pulse current charging and discharging program, battery 1 was cooled to 40° C. Then, battery 1 was discharged to 6 V at a 1 C rate. The measured amount of discharge is 3.28 AH. This is shown as curve 3 in FIG. 7(B). In comparison with the initial SOC, the change in SOC after 100 A pulse charging and discharging is +0.05 AH. This result shows that for the battery, for which the initial SOC was set by the method of the present invention, the charge acceptability is 100% for a 10 second charge of 100 A pulse current at 50° C. and 50% SOC.

Figure 8A:
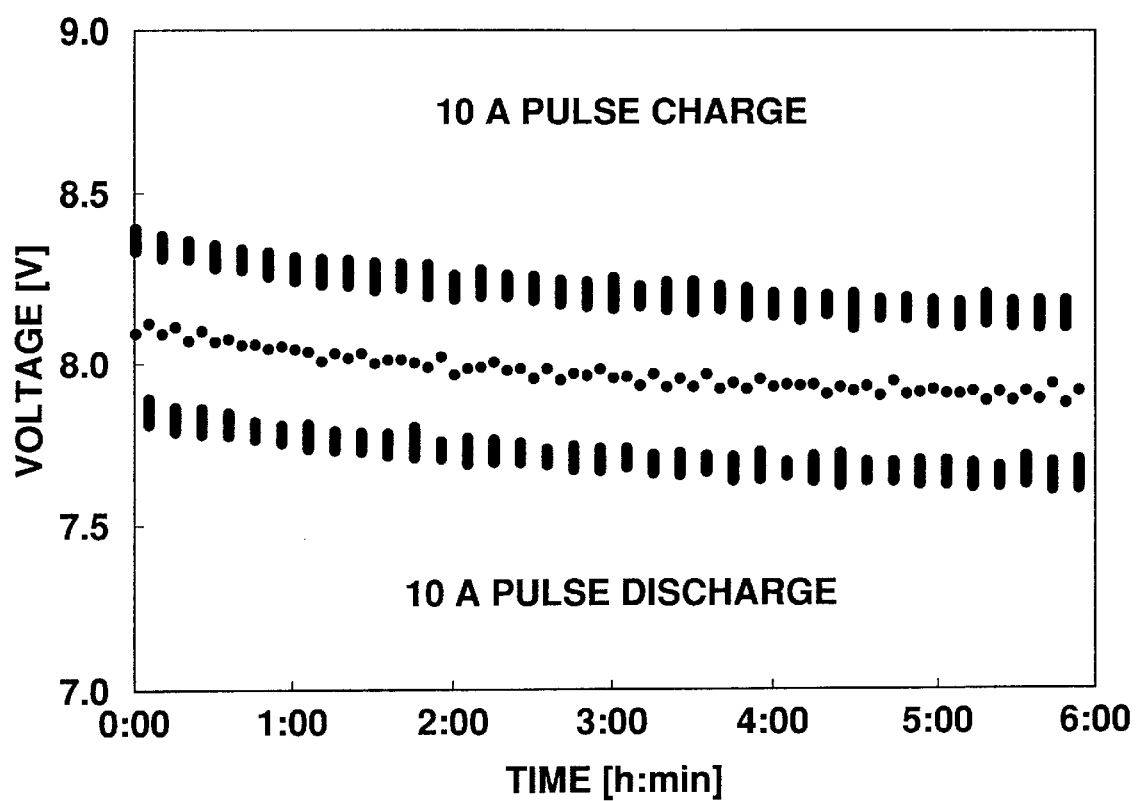
FIGS. 8(A) and 8(B) show illustration of a 10 A pulse current charge efficiency at 50° C. and 50% SOC set by the conventional method.
Figure 8B:
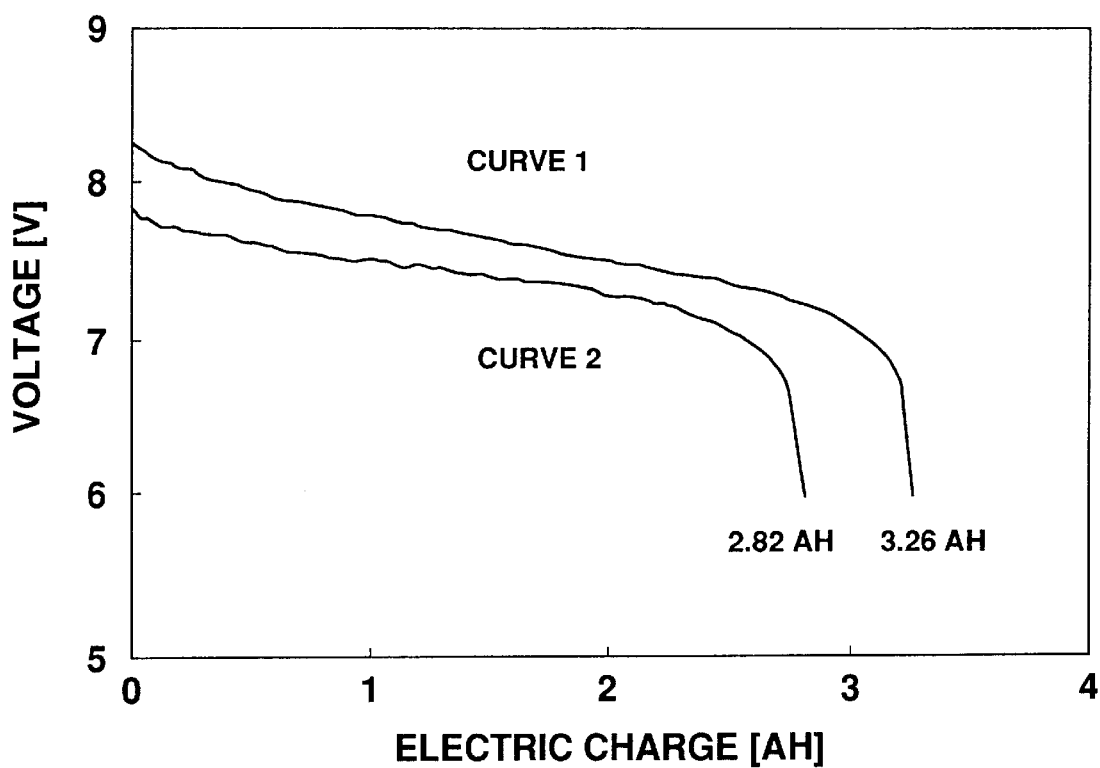

A comparative test for charge acceptability was conducted for battery 2 for which the initial SOC was set by the conventional method. After the setting of the initial SOC was completed by the conventional method at 40° C., the temperature of battery 2 was raised to 50° C., and a constant 10 A pulse current charging and discharging program was performed for battery 2. This program comprises a number of charging and discharging cycles as in the above-mentioned case. Each cycle comprises a 10 second charging period with the 10 A pulse current followed by a 5 minute rest, then a 10 second discharging period with the 10 A pulse current followed by a 5 minute rest. FIG. 8(A) shows the voltage corresponding to the charging and discharging with the 10 A pulse current. The total amount of charge by the 10 A pulse current is 1.00 AH and the total amount of discharge by the 10 A pulse current is 1.00 AH (Qai=Qci).

The final SOC of battery 2 after 10 A pulse current charging and discharging was quantitatively measured by discharging to 6 V at a C/3 rate at 40° C. The resulting amount of discharge is 2.82 AH. This is shown as curve 2 in FIG. 8(B). This calculation shows that the charging efficiency is only 55.1% in spite of the fact that the charging current of 10 A is considerably lower than the requirement of the charge acceptability for hybrid electric vehicle's battery.

Actually, all the conditions of example 2 are identical to those of example 1, except that the temperature is 40° C. in example 1 and 50° C. in example 2. From a comparison between examples 1 and 2, it is evident that the charge acceptability of battery 2, for which the initial SOC was set by the conventional method, is extremely sensitive to battery temperature. At elevated temperature, the charge acceptability of battery 2 greatly decreases. However, for battery 1, for which the initial SOC was set by the new method of the present invention, the influence of battery temperature is extremely small, and the high charge acceptability can be maintained even at elevated temperature.

Example 3

For the same battery used in the above-mentioned example 1, initial charging was performed by the method of the present invention and by the conventional method. Initial charging was performed for battery 1 using the two-step method of the present invention. In step 1, a 7 AH charge was performed at a 1 C rate at 40° C. The actual accepted charge was 6.18 AH as measured from discharging to 6.0 V at a C/3 rate. This is shown as curve 1 in FIG. 9(B). Step 2 is a 1.1 AH discharge at a 1 C rate at 40° C. This is shown as curve 2 in FIG. 9(B). Therefore, the actual SOC that was set by these two steps is 5.08 AH (approximately 82%). With the outer shell of the active particle in the discharged state, the entire electric charge was stored in the center.

The initial SOC of battery 2 was set by the conventional method. A 5.45 AH charge was performed at a 1 C rate at 40° C. The actual accepted charge was measured as 5.22 AH (approximately 84% SOC) by discharging to 6.0 V at a 1 C rate.

Figure 9A:
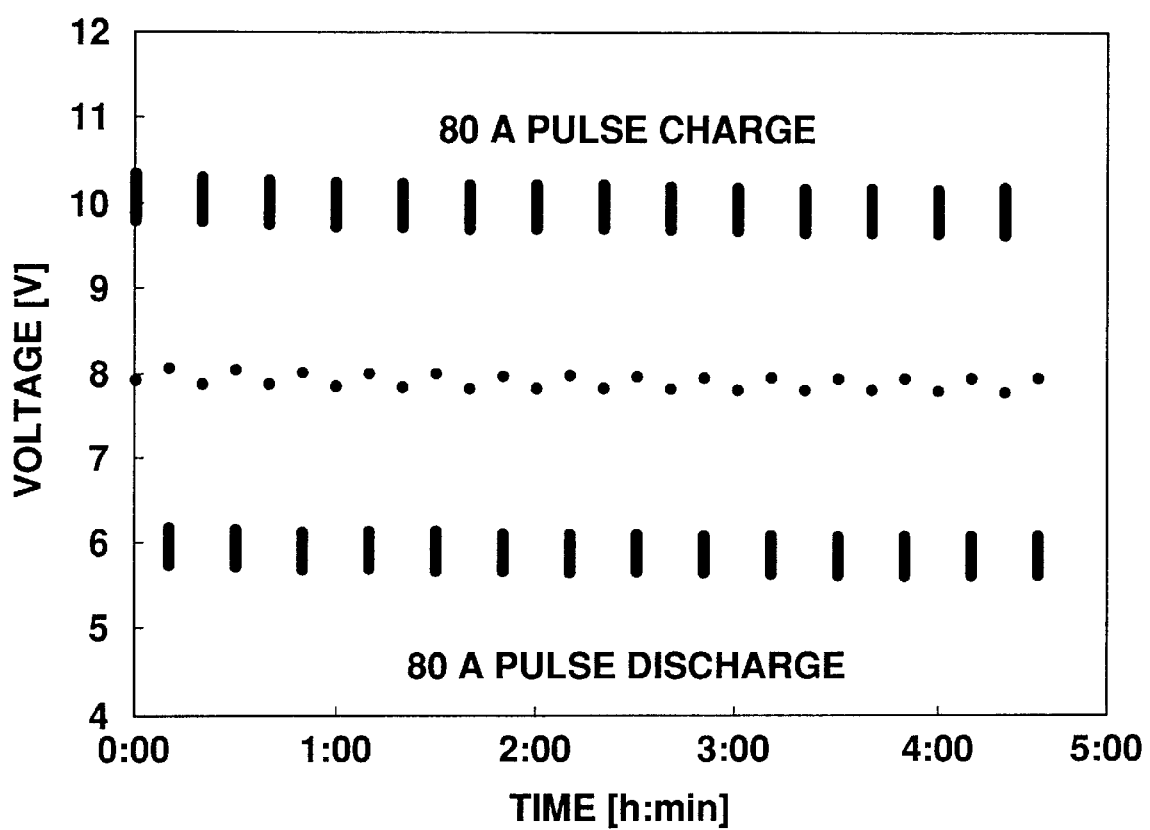
FIGS. 9(A) and 9(B) show illustration of a 80 A pulse current charge efficiency at 40° C. and 80% SOC set by the present inventive method.
Figure 9B:
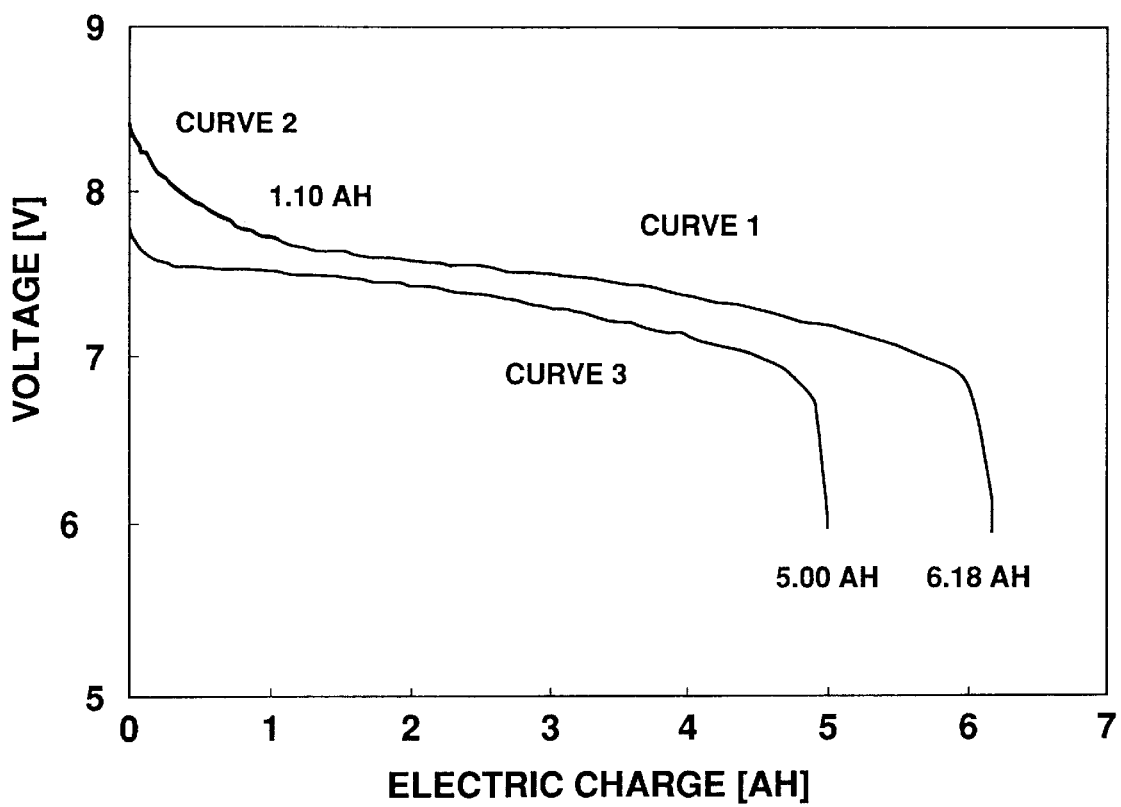

After the initial SOC of 82% was set by the method of the present invention, a charging and discharging program was performed with a constant 80 A pulse current at 40° C. The pulse sequence includes the same ta, tc, and ts as in the above-mentioned examples 1 and 2. The voltage corresponding to 80 A pulse current charging and discharging program is shown in FIG. 9(A). The total amount of charge by the 80 A pulse current is 3.09 AH and the total amount of discharge by the 80 A pulse current is 3.09 AH. The final SOC after 80 A pulse current charging and discharging was measured as 5.00 AH by discharging to 6.0 V at a 1 C rate at 40° C. This result is shown as curve 3 in FIG. 9(B). Therefore, the change in SOC is −0.08 AH, which is still smaller than the error range of the charger. It is evident that the charging efficiency of battery 1, for which the initial SOC was set at 80% at 40° C. by the method of the present invention, is 100%.

Figure 10A:
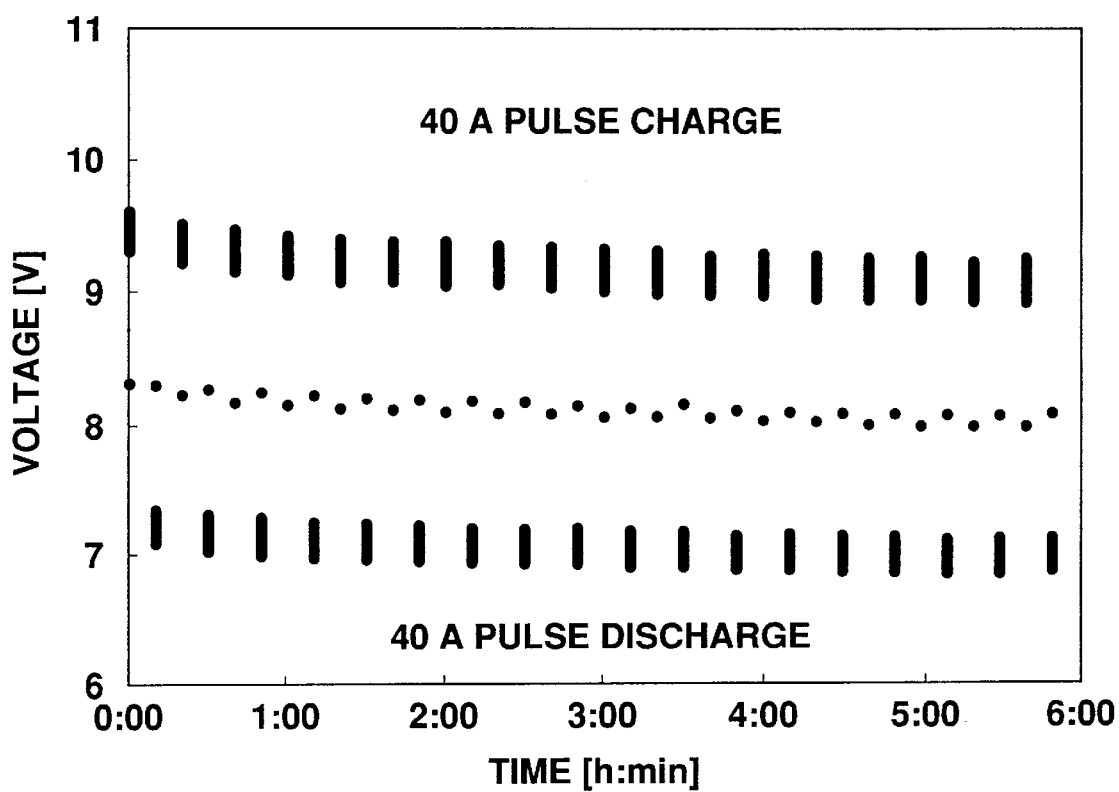
FIGS. 10(A) and 10(B) show illustration of a 40 A pulse current charge efficiency at 40° C. and 80% SOC set by the conventional method.
Figure 10B:
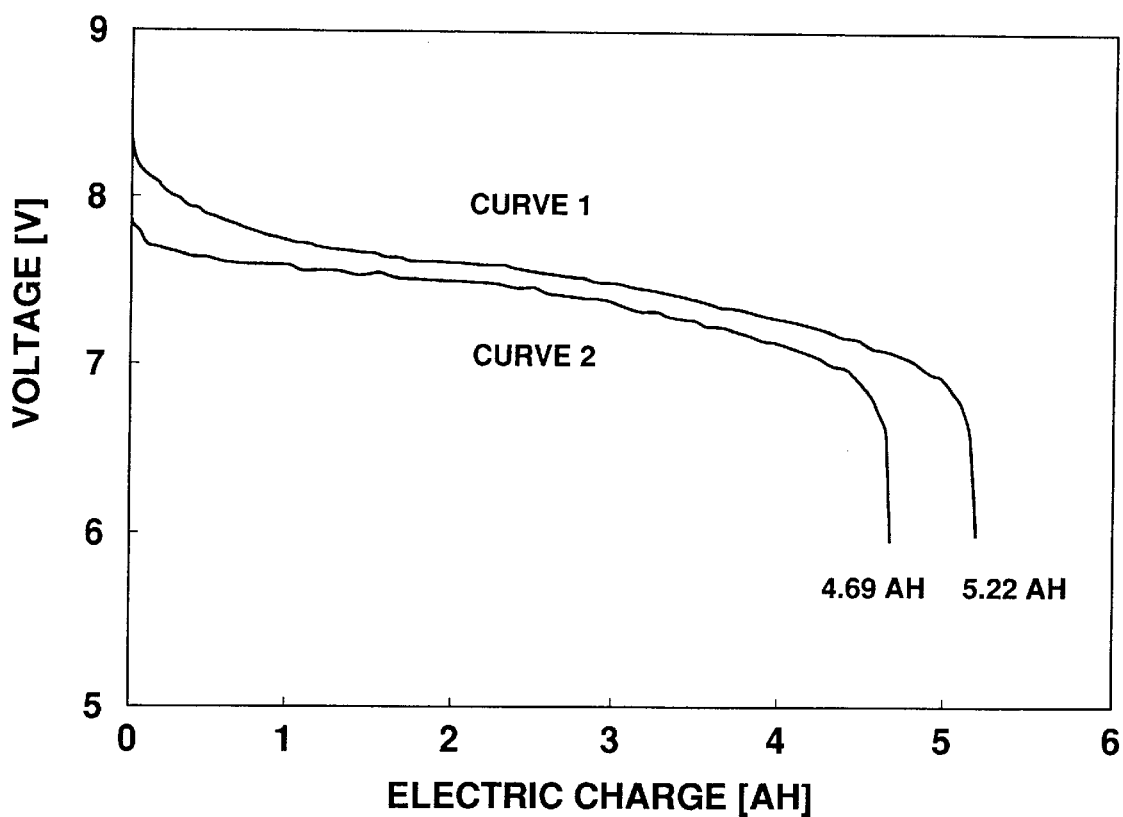

However, after the initial SOC of 80% was set by the conventional method for battery 2, a constant 40 A pulse current charging and discharging program was performed at 40° C. The values of ta, tc, and ts are the same as those for the 80 A pulse current charging and discharging program for battery 1 in this example. The voltage of battery 2 corresponding to the charging and discharging with the 40 A pulse current is shown in FIG. 10(A). The final SOC of battery 2 was measured at 4.69 AH by discharging to 6 V at 1 C rate at 40° C. Therefore, the total change in SOC is −0.53 AH. This change in SOC is equivalent to a charging efficiency of 73%.

This example shows that the new method of setting the initial SOC in the present invention is effective in raising the charge acceptability under high SOC conditions.

Example 4

In this example, the initial SOC of battery 1 was set by the method of the present invention with a charge distribution different from that in examples 1 and 2. This example sets the initial SOC in three steps. The first step performs a 7 AH charge at a 1 C rate at 25° C. The actual accepted charge that was measured by discharging to 6.0 V at 1 C rate at 25° C. is 6.62 AH. The second step is a 5.2 AH discharge at 1 C rate at 25° C. The third step is a 2 AH charge for the battery at 1 C rate at 25° C. This results in an actual charge of 1.93 AH. Therefore, the final SOC that was set through these three steps is 3.34 AH, of which 1.42 AH (21% of battery capacity) was stored in the center of the active particle, and the other 1.92 AH (29% of battery capacity) was stored in the outer layer of the active particle. This state is shown in state III of FIG. 3 (C), where Y%=21% and X%=50%.

Figure 11A:
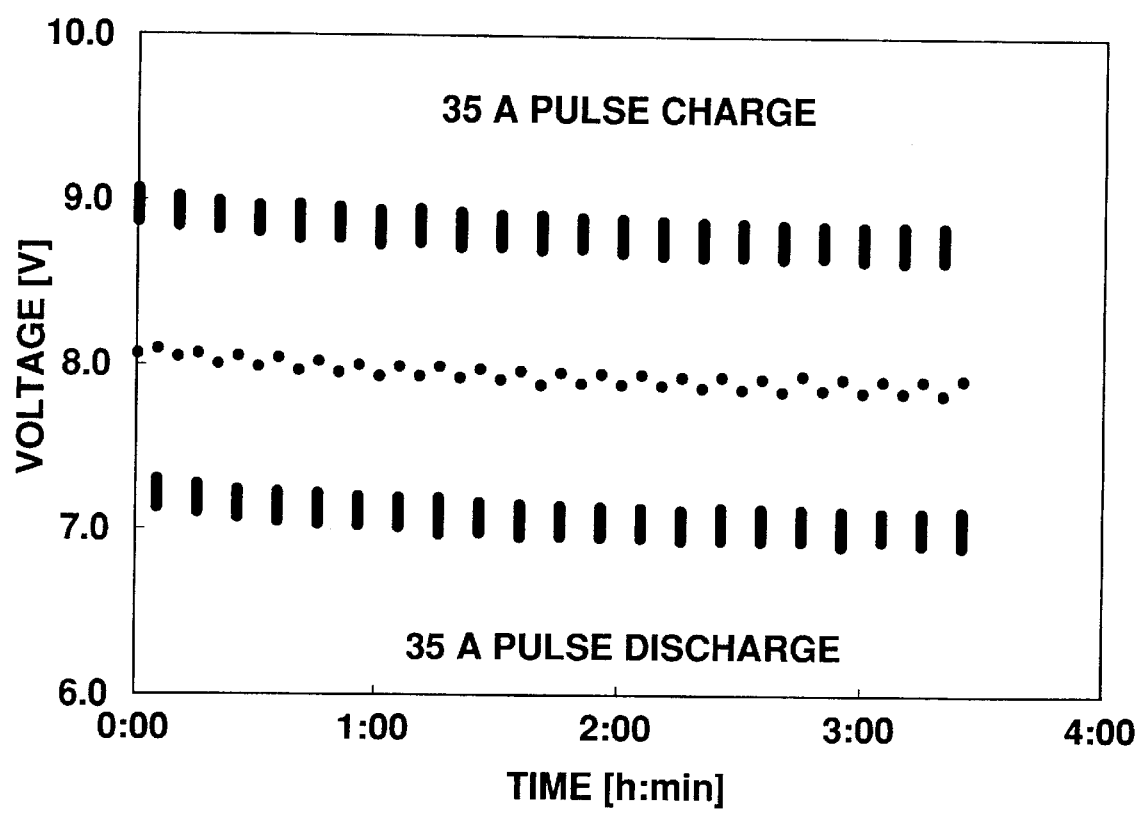
FIGS. 11(A) and 11(B) show illustration of a 35 A pulse current charge efficiency at 50° C. and 50% SOC with 21% in the bulk and 29% in the out surface layer, set by the present inventive method.
Figure 11B:
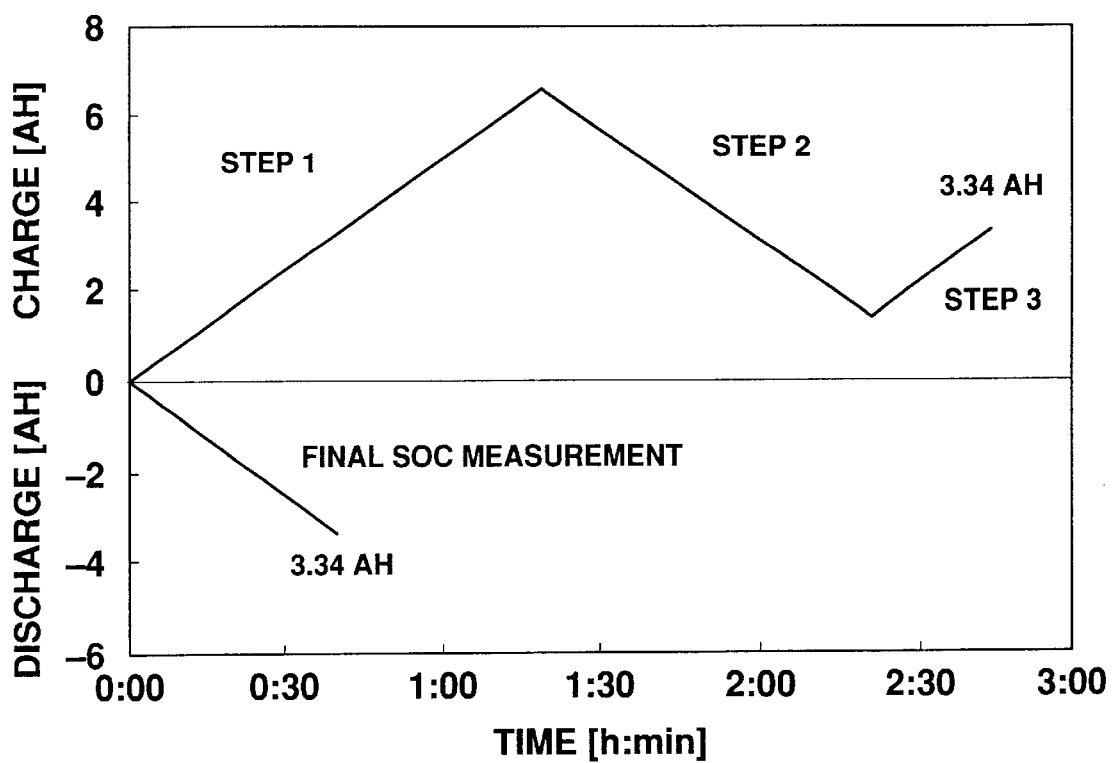

When the initial SOC was set, the temperature of battery 1 was raised to 50° C. and a 35 A constant pulse current charging and discharging program was performed. This pulse current charging and discharging program comprises a number of charging and discharging cycles, where each cycle comprises a 10 second charging period with the 35 A pulse current followed by a 5 minute rest, then a 10 second discharging period with the 35 A pulse current followed by a 5 minute rest. Therefore, the condition of Qai=Qci is satisfied. The voltage response for the 35 A pulse current charging and discharging cycle is shown in FIG. 11(A). The total amount of charge by the 35 A pulse current is 2.04 AH and the total amount of discharge by the 35 A pulse current is 2.04 AH.

The final SOC after pulse current charging and discharging measured by discharging to 6 V at a 1 C rate is 3.34 AH, the value of which is identical to the initial SOC. This result shows that the charging efficiency is 100% at 50° C. with an initial SOC of 50% (having a charge distribution of 21% in the center and 29% in the outer shell of the active particle).

What is claimed is:

1. A charging method for a nickel battery, which has a nickel positive electrode with nickel oxide as an active material, comprising initial charging steps of: fully charging said battery; and after said fully charging step, discharging said battery until a predetermined amount of initial state of charge remains in said battery, wherein execution of the fully charging step and discharging step establish an initial charged state of said battery and cause a position of charged material to remain near a center of the material that forms the nickel positive electrode.

2. The nickel battery charging method according to claim 1, wherein said nickel positive electrode is formed from minute particles having diameters from 1 μm to 100 μm.

3. The nickel battery charging method according to claim 1, wherein the charging or discharging in said fully charging step or said discharging step is performed with constant current.

4. The nickel battery charging method according to claim 1, further comprising:

carrying the nickel battery having said nickel positive electrode in a hybrid electric vehicle equipped with a dynamo for generating a charging current for the nickel battery and a motor that is driven by a discharging current from the nickel battery.

5. A charging apparatus for a nickel battery, which has a nickel positive electrode with nickel oxide as an active material, comprising:

charging means for charging said nickel battery by supplying a charging current thereto;

discharging means for discharging said nickel battery by causing a flow of discharging current therefrom;

full-charge detecting means for detecting a full charge of said nickel battery; and initial discharge detecting means for detecting the completion of discharge until a predetermined amount of initial charge remains and the battery is placed in an initial charged state;

wherein, respective of said charging means and said discharging means being regulated by said full-charge detecting means and said initial discharge detecting means so as to cause a position of charged material to be concentrated near a center of material that forms the nickel positive electrode.

6. The charging apparatus for nickel battery according to claim 5, wherein said nickel positive electrode is formed from minute particles having diameters from 1 $\mu$m to 100 $\mu$m.

7. The charging apparatus for nickel battery according to claim 5, wherein the nickel battery having said nickel positive electrode is configured to be carried in a hybrid electric vehicle equipped with a dynamo for generating a charging current for the nickel battery and a motor that is driven by a discharging current from the nickel battery.

* * * * *